US012675449B2

(12) United States Patent
Yao

(10) Patent No.: US 12,675,449 B2
(45) Date of Patent: Jul. 7, 2026

(54) DATABASE SERVICE PROCESSING METHOD AND APPARATUS

(71) Applicant: Cloud Intelligence Assets Holding (Singapore) Private Limited, Singapore (SG)

(72) Inventor: Zhenxi Yao, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 70 days.

(21) Appl. No.: 18/685,201

(22) PCT Filed: Oct. 8, 2022

(86) PCT No.: PCT/CN2022/123801
§ 371 (c)(1),
(2) Date: Feb. 20, 2024

(87) PCT Pub. No.: WO2023/061257
PCT Pub. Date: Apr. 20, 2023

(65) Prior Publication Data
US 2024/0370415 A1 Nov. 7, 2024

(30) Foreign Application Priority Data
Oct. 15, 2021 (CN) .......................... 202111204071.X

(51) Int. Cl.
*G06F 16/00* (2019.01)
*G06F 9/50* (2006.01)
(Continued)

(52) U.S. Cl.
CPC .......... *G06F 16/212* (2019.01); *G06F 9/5072* (2013.01); *G06F 9/5077* (2013.01);
(Continued)

(58) Field of Classification Search
CPC .... G06F 16/212; G06F 16/256; G06F 9/5072; G06F 9/5077
(Continued)

(56) References Cited

U.S. PATENT DOCUMENTS 9,654,599 B1 * 5/2017 Wheeler ............... G06F 9/4416
707/707
10,353,878 B1 * 7/2019 Mohen .................... G06F 16/00
707/707
(Continued)

FOREIGN PATENT DOCUMENTS

CN 109976870 A 7/2019
CN 112035443 A 12/2020
(Continued)

OTHER PUBLICATIONS

International Search Report dated Nov. 28, 2022, in connection with International Application No. PCT/CN2022/123801.

*Primary Examiner* — Alexandria Y Bromell
(74) *Attorney, Agent, or Firm* — Osha Bergman Watanabe & Burton LLP

(57) ABSTRACT

The present disclosure discloses a database service processing method and apparatus. The method comprises: acquiring a target database service model corresponding to a target database service; acquiring at least one executable unit according to the target database service model, the at least one executable unit is packaged, according to a minimum granularity of the target database service, with a target database service model operation; and acquiring a target database service configuration file according to service requirements of the target database service, the target database service configuration file is arranged based on the at least one executable unit and meets workflow arrangement requirements.

18 Claims, 2 Drawing Sheets

(51) Int. Cl.
　　 *G06F 16/21* 　　　　(2019.01)
　　 *G06F 16/25* 　　　　(2019.01)
(52) U.S. Cl.
　　 CPC ...... *G06F 16/256* (2019.01); *G06F 2209/501*
　　　　　　 (2013.01); *G06F 2209/505* (2013.01)
(58) Field of Classification Search
　　 USPC ........................................................ 707/802
　　 See application file for complete search history.

(56) References Cited

U.S. PATENT DOCUMENTS

| | | | | | |
|---|---|---|---|---|---|
| 11,218,421 | B1 * | 1/2022 | Khan | ................. | H04L 41/0897 |
| | | | | | 707/707 |
| 11,249,742 | B1 * | 2/2022 | Paudel | ...................... | G06F 8/61 |
| | | | | | 707/707 |
| 2004/0034857 | A1 * | 2/2004 | Mangino | ........... | G06Q 10/0631 |
| | | | | | 718/104 |
| 2015/0019488 | A1 * | 1/2015 | Higginson | ........... | G06F 16/214 |
| | | | | | 707/634 |
| 2016/0019276 | A1 * | 1/2016 | Dahbour | ............. | G06F 16/2282 |
| | | | | | 707/626 |
| 2016/0217042 | A1 * | 7/2016 | Wang | ................. | G06F 11/1448 |
| | | | | | 707/707 |
| 2016/0321339 | A1 * | 11/2016 | Tekade | ...................... | G06F 8/76 |
| | | | | | 707/707 |
| 2019/0377713 | A1 * | 12/2019 | Lankford | ........... | G06F 16/2379 |
| | | | | | 707/707 |
| 2019/0384847 | A1 * | 12/2019 | Bobbala | .................... | G06F 7/14 |
| | | | | | 707/707 |
| 2020/0265449 | A1 * | 8/2020 | Sundararaj | ......... | G06Q 30/0276 |
| | | | | | 707/707 |
| 2021/0125007 | A1 * | 4/2021 | Jayanthi | .............. | G06F 11/3006 |
| | | | | | 707/707 |
| 2021/0200744 | A1 * | 7/2021 | Gubba | .................. | G06F 16/258 |
| | | | | | 707/707 |
| 2021/0232591 | A1 * | 7/2021 | Portisch | ........... | G06F 16/24564 |
| | | | | | 707/707 |
| 2021/0303415 | A1 * | 9/2021 | Brunzema | .......... | G06F 11/1469 |
| | | | | | 707/707 |
| 2022/0245032 | A1 * | 8/2022 | Singh | .................... | G06F 16/275 |
| | | | | | 707/707 |
| 2022/0245100 | A1 * | 8/2022 | Kandi | .................. | G06F 16/214 |
| | | | | | 707/707 |

FOREIGN PATENT DOCUMENTS

| | | |
|---|---|---|
| CN | 112099768 A | 12/2020 |
| CN | 113361913 A | 9/2021 |
| CN | 114090541 A | 2/2022 |

* cited by examiner

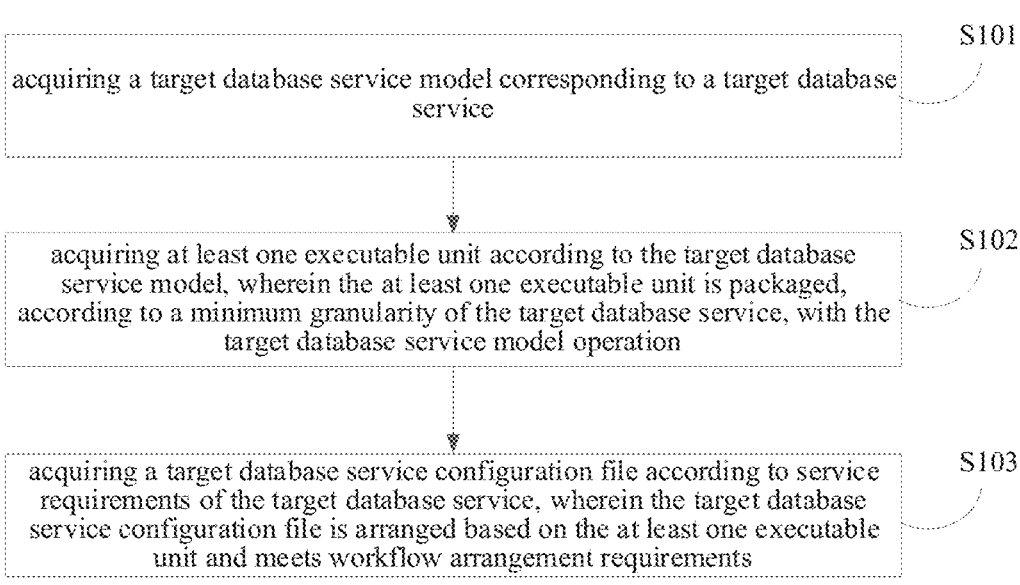

acquiring a target database service model corresponding to a target database service — S101 acquiring at least one executable unit according to the target database service model, wherein the at least one executable unit is packaged, according to a minimum granularity of the target database service, with the target database service model operation — S102 acquiring a target database service configuration file according to service requirements of the target database service, wherein the target database service configuration file is arranged based on the at least one executable unit and meets workflow arrangement requirements — S103

FIG. 1

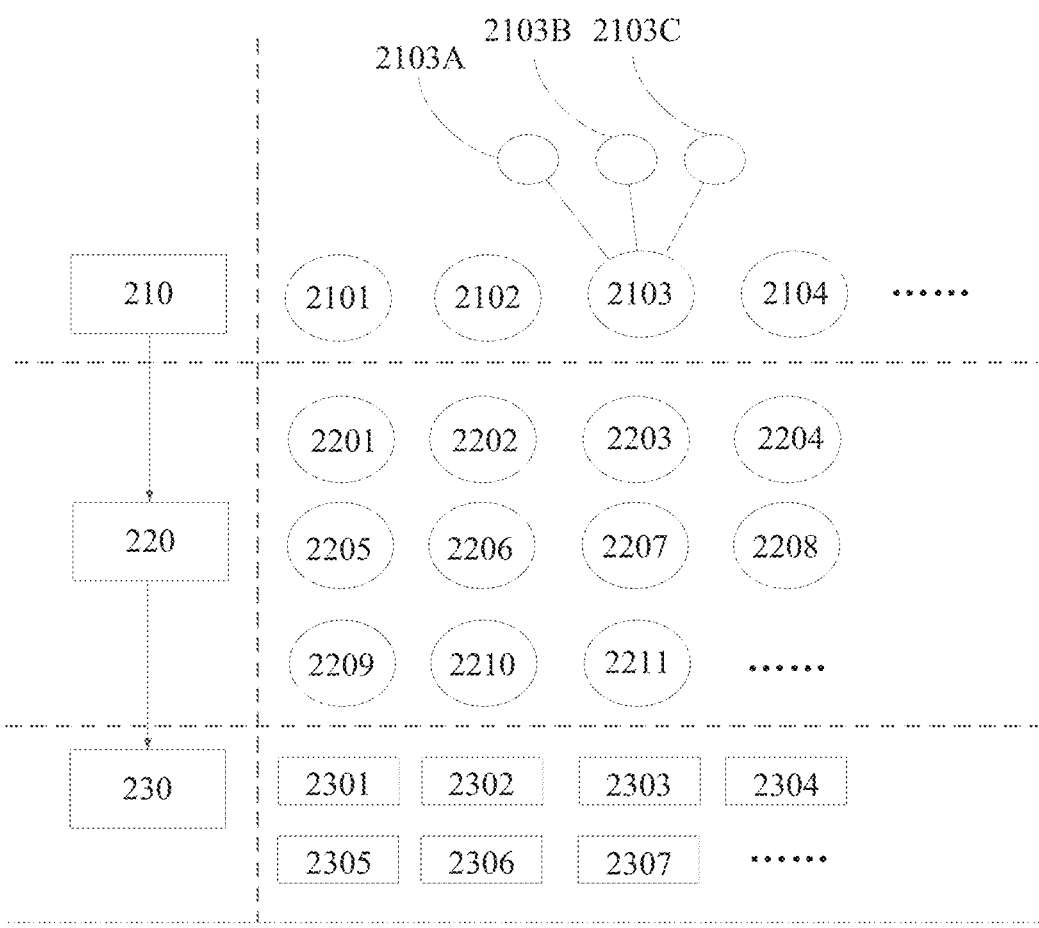

FIG. 2

DATABASE SERVICE PROCESSING METHOD AND APPARATUS

The present application is a National Stage filing under 35 U.S.C. § 371 of International PCT application PCT/CN2022/123801, filed on Oct. 8, 2022, entitled "DATABASE SERVICE PROCESSING METHOD AND APPARATUS". PCT/CN2022/123801 claims priority to Chinese patent application No. 202111204071.X, filed with the China Patent Office on Oct. 15, 2021 and entitled "DATABASE SERVICE PROCESSING METHOD AND APPARATUS", the entire contents of which are incorporated herein by reference.

TECHNICAL FIELD

The present disclosure relates to the field of database technology, and specifically to a database service processing method and apparatus.

BACKGROUND

A database system is a relatively ideal data processing system developed to adapt to the needs of data processing. It is also a software system that provides data for practically runnable storage, maintenance, and application systems. It is a combination of storage media, processing objects, and management systems. In a database system, corresponding nodes may access data in the database. The database system serves as a system capable of storing and maintaining data, its stable and reliable running is a foundation for providing good services to users. In order to ensure the stable and reliable running of the database system, in the database system, resource allocation is required for a corresponding database service to support the database services.

SUMMARY

In order to solve the problems in the relevant art, embodiments of the present disclosure provide a database service processing method and apparatus.

In a first aspect, the present disclosure provides a database service processing method, comprising: acquiring a target database service model corresponding to a target database service, wherein the target database service model is used for indicating at least one target database service model operation corresponding to the target database service, the target database service model operation is used for performing an operation on at least one of a target system resource corresponding to the target database service and a target service parameter of the target database service in a database system; acquiring at least one executable unit according to the target database service model, wherein the at least one executable unit is packaged, according to a minimum granularity of the target database service, with the target database service model operation; and acquiring a target database service configuration file according to service requirements of the target database service, wherein the target database service configuration file is arranged based on the at least one executable unit and meets workflow arrangement requirements.

In a second aspect, the present disclosure provides a database service processing apparatus, comprising: a model acquisition module, configured for acquiring a target database service model corresponding to a target database service, wherein the target database service model is used for indicating at least one target database service model operation corresponding to the target database service, the target database service model operation is used for performing an operation on at least one of a target system resource corresponding to the target database service and a target service parameter of the target database service in a database system; a unit package module, configured for acquiring at least one executable unit according to the target database service model, wherein the at least one executable unit is packaged, according to a minimum granularity of the target database service, with the target database service model operation; and a file arrangement module, configured for acquiring a target database service configuration file according to service requirements of the target database service, wherein the target database service configuration file is arranged based on the at least one executable unit and meets workflow arrangement requirements.

It should be understood that the foregoing general description and the following detailed description are exemplary and explanatory only, and cannot limit the present disclosure.

BRIEF DESCRIPTION OF THE DRAWINGS

In order to clearly illustrate the technical solutions in the embodiments of the present application and in the relevant art, a brief introduction will be made below to the drawings needed in describing the embodiments and the relevant art. Obviously, the drawings in the following description are only some embodiments of the present application. For persons with ordinary skills in the art, other drawings may be further obtained according to these drawings as provided without putting in any creative labor.

FIG. 1 shows a flow chart of a database service processing method according to an implementation of the present disclosure;

FIG. 2 shows a schematic flow chart of a database service processing method according to an implementation of the present disclosure;

DETAILED DESCRIPTION

Figure 3:
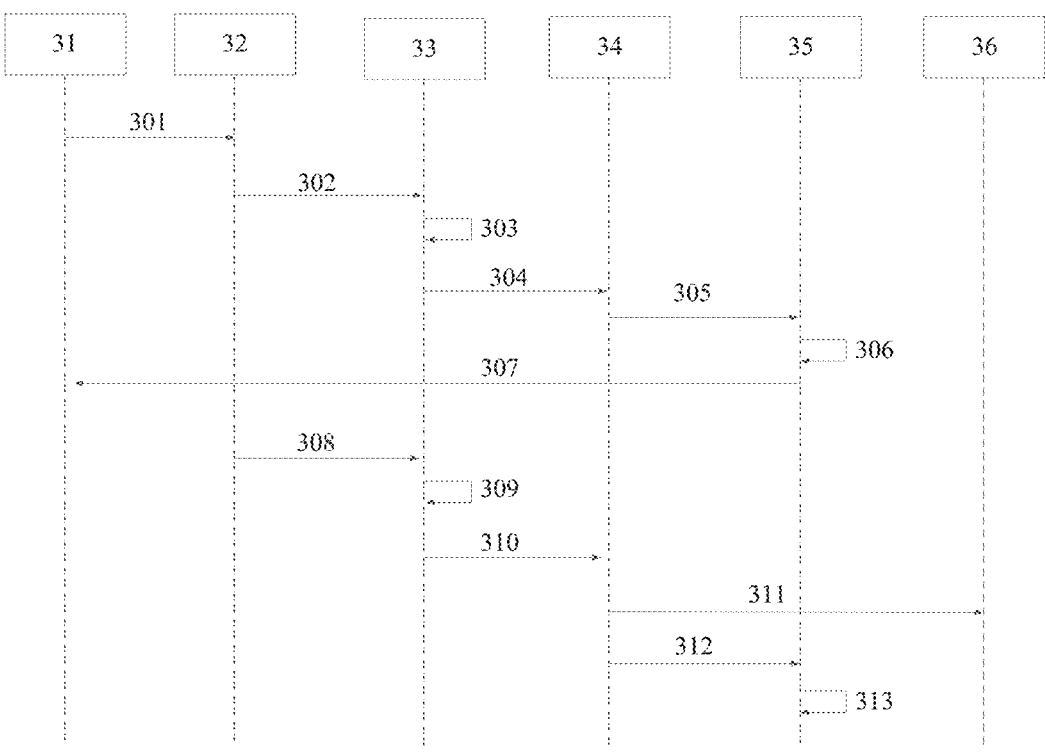
FIG. 3 shows a schematic operation sequence diagram of a database service processing method according to an implementation of the present disclosure.

Hereinafter, exemplary implementations of the present disclosure will be described in detail with reference to the drawings, such that those skilled in the art may easily implement them. In addition, for the sake of clarity, portions irrelevant to exemplary implementations as described are omitted in the drawings. In the present disclosure, it should be understood that terms such as "comprising" or "having" aim to indicate the presence of labels, numbers, steps, actions, parts, portions, or combinations thereof disclosed in this specification, and are not intended to exclude the possibility of the presence or addition of one or more of other labels, numbers, steps, actions, parts, portions, or combinations thereof. Additionally, it should be also noted that embodiments in the present disclosure and labels in the embodiments may be combined with each other in a case of no conflict. The present disclosure will be described in detail below in conjunction with embodiments with reference to the drawings.

In order to perform resource allocation for corresponding database services, corresponding tools (e.g., Kubernets, etc.) may be used to perform resource allocation for different database services respectively, or corresponding operators may manually perform resource allocation for different database services respectively.

Disadvantages of the above solutions: when corresponding tools are used to allocate resources for different database services respectively, this resource allocation process depends on inherent characteristics of the resources, so that only a small portion of the resources required for the database services can be allocated, while the remaining great portion of the resources still need to be allocated manually by operators. Furthermore, in the process of manually allocating resources by operators, since specific resource allocation involves a plurality of different operations such as planning, allocation and calling for relevant resources, and migration, specification change and backup for the database itself, the above operations require a high level of skill for the operators, and may generate a large amount of tedious and detailed work in the process of resource allocation, which tends to go awry and may also lead to failure in fully and effectively utilizing the relevant resources.

Considering the disadvantages of the above solutions, the present disclosure proposed a new solution of: acquiring a target database service model corresponding to a target database service, wherein the target database service model is used for indicating at least one target database service model operation corresponding to the target database service, the target database service model operation is used for performing an operation on at least one of a target system resource corresponding to the target database service and a target service parameter of the target database service in a database system; acquiring at least one executable unit according to the target database service model, wherein the at least one executable unit is packaged, according to a minimum granularity of the target database service, with the target database service model operation; and acquiring a target database service configuration file according to service requirements of the target database service, wherein the target database service configuration file is arranged based on the at least one executable unit and meets workflow arrangement requirements. Compared with the foregoing solutions, in the solution proposed by the present disclosure, by acquiring a target database service model corresponding to a target database service, based on this target database service model, a correspondence may be determined between a target database service model operation for performing an operation on at least one of a target system resource and a target service parameter, and the target database service; by acquiring at least one executable unit according to the target database service model, the at least one executable unit is packaged, according to a minimum granularity of the target database service, with the target database service model operation, it is possible to enable the executable unit to be used for arranging each step required for the target database service according to workflow arrangement requirements under a condition that the executable unit is allowed to perform the operation on at least one of the target system resource and the target service parameter; and by acquiring a target database service configuration file according to service requirements of the target database service, which is arranged based on the at least one executable unit and meets workflow arrangement requirements, it is possible to acquire a target database service configuration file that can be used for execute a database service configuration process for the target database service, so as to achieve the purpose of performing automatic allocation for at least one of the target system resource and the target service parameter required for the target database service, thereby reducing the probability of errors in a process of allocating system resources or service parameters for a database service, and improving the utilization efficiency of system resources or service parameters.

In order to solve the above problem, the present disclosure proposes a database service processing method and apparatus.

FIG. 1 shows a flow chart of a database service processing method according to an implementation of the present disclosure. As shown in FIG. 1, the database service processing method comprises steps S101, S102, and S103. At step S101, a target database service model corresponding to a target database service is acquired, wherein the target database service model is used for indicating at least one target database service model operation corresponding to the target database service, and the target database service model operation is used for performing operation on at least one of a target system resource corresponding to the target database service and a target service parameter of the target database service, in a database system. At step S102, at least one executable unit is acquired according to the target database service model, the at least one executable unit is packaged, according to a minimum granularity of the target database service, with the target database service model operation. At step S103, a target database service configuration file is acquired according to service requirements of the target database service, the target database service configuration file is arranged based on the at least one executable unit and meets workflow arrangement requirements.

In an implementation of the present disclosure, the target database service may be understood as a service that performs operations on the target database or data in the target database. For example, the target database service may be a service that initializes the target database, may be a service that reads data from the target database, may also be a service that writes data into the target database, or other services. In an implementation of the present disclosure, Table 1 shows correspondences between database service identifiers and database service purposes, where the target database service may be a database service corresponding to any database service identifier in Table 1.

TABLE 1

| Database Service Identifier | Database Service Purpose |
| --- | --- |
| CreateSharedStorageCluster | create instance cluster |
| SharedStorageClusterAddRo | add ro node |
| ExtendStorageSharedStorageCluster | extend storage |
| SharedStorageClusterFlushParams | flush parameters to engine |
| SharedStorageClusterMigrateRo | migrate ro node |
| SharedStorageClusterMigrateRw | migrate rw node |
| SharedStorageClusterModifyClass | modify instance class |
| SharedStorageClusterRebuild | rebuild cluster |
| SharedStorageClusterRebuildRo | rebuild ro node |
| SharedStorageClusterRemoveRo | remove ro node |
| SharedStorageClusterRestartCluster | restart cluster |
| SharedStorageClusterRestartIns | restart instance |
| SharedStorageClusterSwitchRw | switch read/write |
| SharedStorageClusterUpgradeMinorVersion | upgrade minor version |

In an implementation of the present disclosure, the target database service model may be understood as a model abstracted from the target database service. It should be noted that a plurality of different target database service models may be obtained by abstracting from one target database service, that is, one target database service may correspond to a plurality of different target database service models. Meanwhile, target database service models abstracted from different target database services may be the same, that is, one target database service model may simultaneously correspond to a plurality of target database services. In an implementation of the present disclosure, Table 2 shows correspondences among database service model identifiers, database service model names, database service model operation identifiers, and database service model operation purposes. The target database service model may be a database service model corresponding to any database service model identifier in Table 2.

TABLE 2

| Database Service Model Identifier | Database Service Model Name | Database Service Model Operation Identifier | Database Service Model Operation Purpose |
|---|---|---|---|
| Account | Account Model | CreateAccountWithRandPassword | create account with random password |
| | | CreateAccountWithPassword | create account with specified password |
| DbClusterBase | Database Cluster Model Base | Init | initialize |
| | | InitClass | initialize class |
| | | InitVersion | initialize kernel version |
| | | InitEngineParams | initialize kernel parameters |
| | | ModifyClassParams | modify class-related parameters |
| | | SaveLatestFlushTime | save the latest parameter flush time |
| | | InitAccount | initialize account |
| | | DisableHA | disable high availability |
| | | EnableHA | enable high availability |
| | | EnsureCmAffinity | ensure ClusterManager Pod affinity |
| | | UpgradeCmVersion | upgrade ClusterManager version |
| | | FlushParams | flush parameters |
| | | DeleteCm | delete ClusterManager |
| | | GetEffectiveParams | calculate kernel parameters that should be set before flushing parameters, after logical processing |
| | | GetEffectiveUserParams | calculate user parameters before flushing parameters, after logical processing |
| | | GetUserParams | get kernel parameters set by users |
| | | GetRunningParams | get currently running kernel parameters |
| SharedStorage DbClusterBase | Shared Storage-based Database Cluster Model Base | Init | initialize |
| | | UseStorage | use storage |
| | | SetStorageWriteLock | set write lock |
| | | ReleaseStorage | release storage |
| DbIns | Database Instance Model | Init | initialize instance |
| | | CreatePod | create instance Pod |
| | | DeletePod | delete instance Pod |
| | | StopEngineAndDeletePod | stop engine and delete instance Pod |
| | | EnsureInsTypeMeta | ensure read/write type metadata of Pod |
| | | InstallDbIns | install engine |
| | | GetPrimarySystemIdentifier | get unique system identifier |
| | | SetupLogAgent | set collection component data |
| | | SetDbInsInstalled | identify that the instance engine has been installed |
| | | CreateAccount | create instance account |
| | | DoHealthCheck | check health state of instance |
| | | CreateReplicationSlot | create replication slot |
| | | DoHealthCheckWithTimeout | check health state of instance |
| | | FlushParams | flush engine parameters |
| | | Restart | restart instance |
| | | GracefulStopEngine | exit engine safely |
| | | StartEngine | start engine |
| | | GrowStorage | expand file system |
| EngineClass | Instance Class Model | GetClassList | get class list |
| | | GetClass | get a certain class |
| ParamsTemplate | Parameter Template Model | GetMergedTemplateParams | get merged parameter template |
| | | GetClassInitParams | get class initial parameters |

TABLE 2-continued

| Database Service Model Identifier | Database Service Model Name | Database Service Model Operation Identifier | Database Service Model Operation Purpose |
|---|---|---|---|
| MinorVersions | Kernel Minor Version Model | GetMinorVersionList | get supported kernel minor version list |
| | | GetLatestMinor Version | get latest kernel minor version information |
| SharedStorage Cluster | Shared Storage-based One-Write-Multiple-Read Database Cluster Model | Init | initialize |
| | | InitMeta | initialize cluster metadata |
| | | InitDbInsMeta | initialize instance metadata |
| | | AddInsToClusterManager | add instance to ClusterManager topo |
| | | RemoveInsFromClusterManager | remove instance from ClusterManager topo |
| | | GenerateTempRoIds | generate temporary RO identifier |
| | | InitTempRoInsMeta | initialize temporary RO metadata |
| | | ConvertTempRoForRwToRo | convert temporary RO to RO |
| | | SwitchNewRoToRw | switch temporary RO to RW |
| | | Switchover | switch read/write |
| | | DeleteOldIns | delete old instance |
| | | SyncInsStateFromClusterManager | synchronize instance state from ClusterManager |
| | | SetInsState | set instance state |
| | | EnsureInsTypeMeta | ensure instance type metadata |
| | | FlushParamsIfNecessary | execute parameter flush operation if necessary |
| | | RestartIns | restart instance |
| | | RestartCluster | restart cluster |
| | | GrowStorage | expand file system |
| | | FlushClusterParams | flush cluster parameters |
| IStorageManager | Shared Storage Management Component Model | InitWithAddress | initialize |
| | | UseStorage | use storage |
| | | SetWriteLock | set write lock |
| | | GetTopo | get read/write node topo |
| | | Expand | expand storage |
| | | Release | release |
| IManagerClient | Engine Management Component Model | SetIns | set instance |
| | | InstallEngine | install engine |
| | | SetupLogAgent | install log collection component |
| | | StartEngine | start engine |
| | | GracefulStopEngine | exit engine safely |
| | | RestartEngine | restart engine |
| | | LockEngine | lock engine |
| | | CreateEngineAccount | create account |
| | | UpdateEngineParams | update engine parameters |
| | | GrowStorage | expand file system |
| | | CheckHealth | check health state |
| | | ForceStopEngine | exit engine forcefully |
| | | GetPrimarySystemIdentifier | get unique system identifier |
| | | CreateReplicationSlot | create replication slot |
| IEnginePod Manager | Instance Container Management Component Model | Init | initialize |
| | | SetIns | set instance |
| | | CreatePodAndWaitReady | create instance Pod and wait for ready |
| | | DeletePod | delete instance Pod |
| | | IsDeleted | whether instance Pod has been deleted |
| | | EnsureInsTypeMeta | ensure instance type metadata |
| IClusterManager Client | Cluster Management Component Model | SetLeader | set as leader |
| | | SetFollower | set as follower |
| | | InitWithLocalDbCluster | initialize |
| | | DisableHA | disenable high availability |
| | | EnableHA | enable high availability |
| | | AddIns | add instance |
| | | RemoveIns | remove instance |
| | | Switchover | switch read/write |
| | | GetClusterState | get cluster state |
| | | EnsureAffinity | ensure affinity |
| | | UpgradeVersion | upgrade version |

In an implementation of the present disclosure, the database system may be understood as a system that carries a target database. The database system may be distributed, or non-distributed. For example, a distributed database system based on shared storage technology may comprise a plurality of hosts or computing nodes, and data in this database may be accessed simultaneously through different hosts or computing nodes. In an implementation of the present disclosure, the target system resources in the database system corresponding to the target database service may be understood as resources of the database system required to execute the target database service, wherein the resources of the database system may include hardware resources and software resources. For example, the resources of the database system may include computing resources, storage resources, and network resources of the database system. The computing resources may be understood as computation workload, computation speed, or the like, the storage resources may be understood as data storage space, data storage time period, data write rate, data read rate, or the like, and the network resources may be understood as available ports, available addresses, network communication rate, network traffic, or the like. In an implementation of the present disclosure, the target service parameters may be understood as parameters used to configure the target database service or the target database. For example, the target service parameters may include a version number of the target database, an account corresponding to the target service, or the like. It should be noted that the target service parameters may be irrelevant to data stored in the target database. In an implementation of the present disclosure, the minimum granularity of the target database service may be understood as the smallest constituent obtained after performing step division on the target database service according to requirements of the target database service, and executable units obtained by packaging according to the minimum granularity of the target database service may correspond to different steps required for the target database service. In an implementation of the present disclosure, the executable unit may be understood as a unit capable of implementing one or more database service model operations. Furthermore, the executable unit can be used as one step in various database service configuration processes, and a plurality of executable units may also be combined to form one step in a database service configuration process.

In an implementation of the present disclosure, the target database service configuration file may further comprise an executable unit identifier corresponding to the executable unit, which is used for arranging the target database service configuration file. For example, correspondences among executable units, executable unit identifiers, and executable unit functions (purposes) may be shown in Table 3.

TABLE 3

| Executable Unit | Executable Unit Identifier | Executable Unit Function |
| --- | --- | --- |
| workflow_shared.InitMeta | InitMeta | initialize metadata |
| workflow_shared.PrepareStorage | PrepareStorage | prepare storage of PVC |
| workflow_shared.CreateRwPod | CreateRwPod | create read-write (rw) instance |
| workflow_shared.CreateRoPods | CreateRoPods | create read-only (ro) instance |
| workflow_shared.CreateClusterManager | CreateClusterManager | create cluster management tool Cluster Manager (CM) |
| workflow_shared.AddToClusterManager | AddToClusterManager | add node to CM to be managed by CM |
| workflow_shared.UpdateRunningState | UpdateRunningState | update state into cluster information |
| workflow_shared.GenerateAddRoTempId | GenerateAddRoTempId | create one temporary ro node |
| workflow_shared.InitTempRoMeta | InitTempRoMeta | create metadata of temporary ro node |
| workflow_shared.EnsureNewRoUpToDate | EnsureNewRoUpToDate | ensure consistency between ro information and that in cluster |
| workflow_shared.CleanAllTempMeta | CleanAllTempMeta | clean all temporary metadata |
| workflow_shared.ExtendStorageFs | ExtendStorageFs | extend storage file system |
| workflow_shared.DisableHA | DisableHA | disable high availability (HA) function of cluster |
| workflow_shared.FlushParams | FlushParams | flush configured parameters to engine |
| workflow_shared.RestartClusterIfNeed | RestartClusterIfNeed | restart cluster if necessary |
| workflow_shared.EnableHA | EnableHA | enable high availability (HA) function of cluster |
| workflow_shared.SaveParamsLastUpdateTime | SaveParamsLastUpdateTime | record latest timestamp of updating parameters |
| workflow_shared.GenerateMigrateTempId | GenerateMigrateTempId | generate temporary ID for migrate node |
| workflow_shared.EnsureRoMigrate | EnsureRoMigrate | ensure that ro node has been migrated |
| workflow_shared.CreateTempRoForRw | CreateTempRoForRw | create one temporary ro node for generating rw |
| workflow_shared.ConvertTempRoToRo | ConvertTempRoToRo | convert temporary ro to formal ro |

TABLE 3-continued

| Executable Unit | Executable Unit Identifier | Executable Unit Function |
|---|---|---|
| workflow_shared.SwitchNewRoToRw | SwitchNewRoToRw | convert new ro to rw |
| workflow_shared.DeleteOldRw | DeleteOldRw | delete old rw |
| workflow_shared.EnsureCmRwAffinity | EnsureCmRwAffinity | ensure that Affinity information of rw complies with CM requirements |
| workflow_shared.GenerateTempRoIds | GenerateTempRoIds | generate ID of temporary ro |
| workflow_shared.UpdateModifyClassMeta | UpdateModifyClassMeta | update metadata with changed configuration |
| workflow_shared.FlushParamsIfNecessary | FlushParamsIfNecessary | flush parameters if necessary |
| workflow_shared.CleanModifyClassTemp Meta | CleanModifyClassTempMeta | update temporary metadata with changed configuration |
| workflow_shared.SetRebuildTag | SetRebuildTag | set rebuild tag for cluster |
| workflow_shared.CleanOldTempMeta | CleanOldTempMeta | clean temporary data of old cluster |
| workflow_shared.RemoveClusterManager | RemoveClusterManager | remove CM |
| workflow_shared.RemoveAllInsPod | RemoveAllInsPod | remove all instance nodes |
| workflow_shared.GenerateRebuildRo TempId | GenerateRebuildRoTempId | generate rebuild ro ID |
| workflow_shared.StopOldRo | StopOldRo | stop old ro instance |
| workflow_shared.RemoveRo | RemoveRo | remove ro node |
| workflow_shared.RestartCluster | RestartCluster | restart cluster |
| workflow_shared.RestartIns | RestartIns | restart instance |
| workflow_shared.SwitchRw | SwitchRw | switch read/write instance |
| workflow_shared.InitUpgradeImages | InitUpgradeImages | initialize image to be updated |
| workflow_shared.UpgradeCmVersion | UpgradeCmVersion | update CM version no. |
| workflow_shared.CleanUpgradeTempMeta | CleanUpgradeTempMeta | clean and update used temporary metadata |

In an implementation of the present disclosure, the target database service configuration file may be understood as a file stored in a readable data exchange format. For example, the target database service configuration file may be a file stored in yml format, xml format, or json format. In an implementation of the present disclosure, the service requirements of the target database service may be understood as indicating all target system resources and all target service parameters required for the target database service. In an implementation of the present disclosure, the target database service configuration file meeting workflow arrangement requirements may be understood as that corresponding executable units may be executed in an execution sequence of steps according to this target database service configuration file, so as to automatically complete execution of a database service configuration process for the target database service.

In an implementation of the present disclosure, FIG. 2 shows a schematic flow chart of one example of the database service processing method according to an implementation of the present disclosure. As shown in FIG. 2, at step 210, a target database service model corresponding to a target database service is acquired, wherein the target database service model obtained through step 210 may include a database service model 2101 with a database service model identifier of Account, a database service model 2102 with a database service model identifier of DbClusterBase, and a database service model 2103 with a database service model identifier of SharedStorageDbClusterBase, and a database service model 2104 with a database service model identifier of DbIns, etc. Explanation is made by taking an example in which database service model 2103 with the database service model identifier of SharedStorageDbClusterBase is used as the target database service model. This database service model 2103 may comprise at least one target database service model operation for performing operations on an account 2103A of the target database service, a version number 2103B of the target database, and a parameter 2103C of the target database service, wherein the account 2103A of the target database service, version number 2103B of the target database, and parameter 2103C of the target database service all belong to the target service parameters of the target database service. At step 220, at least one executable unit is acquired according to the target database service model, the at least one executable unit is packaged, according to a minimum granularity of the target database service, with the target database service model operation, wherein the executable unit obtained through step 220 may include an executable unit 2201 with an executable unit identifier of InitMeta, an executable unit 2202 with an executable unit identifier of PrepareStorage, an executable unit 2203 with an executable unit identifier of CreateRwPod, an executable unit 2204 with an executable unit identifier of CreateRoPods, an executable unit 2205 with an executable unit identifier of CreateClusterManager, an executable unit 2206 with an executable unit identifier of AddToCluster-Manager, an executable unit 2207 with an executable unit identifier of UpdateRunningState, an executable unit 2208 with an executable unit identifier of GenerateAddRoTempId, an executable unit 2209 with an executable unit identifier of InitTempRoMeta, an executable unit 2210 with an executable unit identifier of EnsureNewRoUpToDate, an executable unit 2211 with an executable unit identifier of CleanAllTempMeta, etc. At step 230, a target database service configuration file is acquired according to service requirements of the target database service, the target database service configuration file is arranged based on the at least one executable unit and meets workflow arrangement requirements, wherein the target database service configuration file obtained through step 230 may include a database service configuration file 2301 acquired according to service requirements of a database service with a database service identifier of CreateSharedStorageCluster, a database service configuration file 2302 acquired according to service requirements of a database service with a database service identifier of SharedStorageClusterAddRo, a database service configuration file 2303 acquired according to service requirements of a database service with a database service identifier of ExtendStorageSharedStorageCluster, a database service configuration file 234 acquired according to service requirements of a database service with a database service identifier of SharedStorageClusterFlushParams, a database service configuration file 2305 acquired according to service requirements of a database service with a database service identifier of SharedStorageClusterMigrateRo, a database service configuration file 2306 acquired according to service requirements of a database service with a database service identifier of SharedStorageClusterMigrateRw, a database service configuration file 2307 acquired according to service requirements of a database service with a database service identifier of SharedStorageClusterModifyClass, etc.

Compared with the foregoing solutions, in the solution proposed by the present disclosure, by acquiring a target database service model corresponding to a target database service, based on this target database service model, a correspondence may be determined between a target database service model operation for performing an operation on at least one of a target system resource and a target service parameter, and the target database service; by acquiring at least one executable unit according to the target database service model, wherein the at least one executable unit is packaged, according to a minimum granularity of the target database service, with the target database service model operation, it is possible to enable the executable unit to be used for arranging each step required for the target database service according to workflow arrangement requirements under a condition that the executable unit is allowed to perform the operation on at least one of the target system resource and the target service parameter; and by acquiring a target database service configuration file according to service requirements of the target database service, which is arranged based on the at least one executable unit and meets workflow arrangement requirements, it is possible to acquire a target database service configuration file that can be used for execute a database service configuration process for the target database service, so as to achieve the purpose of performing automatic allocation for at least one of the target system resource and the target service parameter required for the target database service, thereby reducing the probability of errors in a process of allocating system resources or service parameters for a database service, and improving the utilization efficiency of system resources or service parameters.

In an implementation of the present disclosure, the database service processing method further comprises: executing, according to the database service configuration file, a database service configuration process for the target database service. According to the solution provided in the embodiments of the present disclosure, at least one of the target system resources and the target service parameters required for the target database service can be automatically allocated, and there is no need for manual participation in the allocation of system resources or service parameters, thereby reducing the probability of errors in a process of allocating system resources or service parameters for a database service, and improving the utilization efficiency of system resources or service parameters.

In an implementation of the present disclosure, the database service processing method further comprises: interrupting the execution of the database service configuration process in response to the execution of the database service configuration process having been failed; acquiring interruption recovery indication information, and recovering the execution of the database service configuration process according to the interruption recovery indication information, wherein the interruption recovery indication information is used for indicating a data flow step for recovering the execution of the database service configuration process.

In an implementation of the present disclosure, the failure of the database service configuration process may be understood as a failure of the database service configuration process caused by an error that occurs in the database service configuration process, or a failure of the database service configuration process caused by an external intervention in the database service configuration process. The error that occurs in the database service configuration process may be caused by system resources or service parameters involved in the database service configuration process exceeding a preset range, or may be caused by a change occurring in the system resources or service parameters involved in the database service configuration process. The present disclosure does not make any specific limitation on reasons for the error occurred in the database service configuration process.

In an implementation of the present disclosure, the interruption recovery indication information may be stored in the database system in advance, or may be acquired from other apparatuses or systems. For example, it is possible to receive interruption recovery indication information sent by a human-computer interaction apparatus, and this interruption recovery indication information is input by a user through the human-computer interaction apparatus. It should be noted that the present disclosure does not make any specific limitation on a mode of acquiring the interruption recovery indication information.

In an implementation of the present disclosure, the data flow step for recovering the execution of the database service configuration process may be understood as a specific step of the database service configuration process from which to start to recover the execution of the database service configuration process. For example, it is possible to start execution from a first step of the database service configuration process, or start execution from a last step of the database service configuration process as executed prior to the interruption of this database service configuration process, or start execution from a step next to the last step of the database service configuration process as executed prior to the interruption of this database service configuration process. According to the technical solution provided in the embodiments of the present disclosure, when the execution of the database service configuration process fails, the execution of the database service configuration process can be recovered timely from a corresponding step, thereby improving the probability of completion of the execution of the database service configuration process.

In an implementation of the present disclosure, the database service processing method further comprises: setting a state of the target system resource and a state of the target service parameter to a stable state in response to the execution of the database service configuration process having been interrupted or completed, wherein the state of the target system resource being the stable state is used for indicating that the target system resource is consistent with a desired system resource of the target database service, and the state of the target service parameter being the stable state is used for indicating that the target service parameter is consistent with a desired service parameter of the target database service; or setting a state of the target system resource and a state of the target service parameter to an unstable state in response to the execution of the database service configuration process not having being interrupted or having been recovered, wherein the state of the target system resource being the unstable state is used for indicating that the target system resource is inconsistent with a desired system resource of the target database service, and the state of the target service parameter being the unstable state is used for indicating that the target service parameter is inconsistent with a desired service parameter of the target database service. In an implementation of the present disclosure, the desired system resource of the target database service may be understood as system resources of the database system required when this target database service is executed normally. The desired service parameter of the target database service may be understood as parameters configured for the target database service or parameters configured for the target database when this target database service is executed normally. According to the technical solution provided in the embodiments of the present disclosure, the state of the target system resource and the state of the target service parameter may be set based on an execution condition of the database service configuration process, thereby facilitating determination of whether the target database service can be executed normally according to the state of the target system resource and the state of the target service parameter.

In an implementation of the present disclosure, the database service processing method further comprises: acquiring a changed database service configuration file in response to determining that at least one of the target system resource and the target service parameter has been changed, wherein the changed database service configuration file is arranged based on at least one changed executable unit obtained by packaging, according to the minimum granularity of the target database service, a changed database service model operation corresponding to the target database service, the changed database service model operation is used for performing an operation on at least one of a changed target system resource and a changed target service parameter; and executing, according to the changed database service configuration file, the database service configuration process for the target database service. In one embodiment of the present disclosure, the determination of a change occurring in at least one of the target system resource and the target service parameter may be achieved by monitoring a change condition of the target system resource and the target service parameter with a corresponding tool, and determining, according to a monitoring result, whether at least one of the target system resource and the target service parameter is changed. According to the technical solution provided in the embodiments of the present disclosure, when a change occurs in at least one of the target system resource and the target service parameter, a corresponding database service configuration process may be executed timely for the target database service according to a changed database service configuration file, such that the system resource and service parameter required for the target database service are consistent with the system resource and service parameter configured for the target database service, ensuring that the target database service can also be executed normally after at least one of the target system resource and the target service parameter has been changed.

In an implementation of the present disclosure, prior to acquiring the changed database service configuration file in response to determining that at least one of the target system resource and the target service parameter has been changed, the database service processing method further comprises: monitoring a database resource model used for indicating system resources of the database system and service parameters of at least one database service; and checking whether at least one of the target system resource and the target service parameter is changed, in response to determining, according to a monitoring result, that at least one of the system resources of the database system and the service parameters of the at least one database service has been changed.

In an implementation of the present disclosure, the database resource model may be achieved through a corresponding tool, as shown below.

In an implementation of the present disclosure, the monitoring a database resource model may be achieved through a corresponding tool. For example, the database resource model may be monitored through the management controller in the Kubernets software. According to the technical solution provided in the embodiments of the present disclosure, it is possible to ensure that it can timely find out whether at least one of the target system resource and the target service parameter is changed, so as to facilitate timely acquisition of a changed database service configuration file and execution of a database service configuration process for the target database service according to the changed database service configuration file, thereby reducing the probability that the target database service cannot be executed normally due to a change occurring in at least one of the target system resource and the target service parameter.

In an implementation of the present disclosure, the checking whether at least one of the target system resource and the target service parameter is changed comprises: checking whether at least one of a state of the target system resource and a state of the target service parameter is an unstable state, wherein the state of the target system resource being the unstable state is used for indicating that the target system resource is inconsistent with a desired system resource of the target database service, and the state of the target service parameter being the unstable state is used for indicating that the target service parameter is inconsistent with a desired service parameter of the target database service. In an implementation of the present disclosure, the desired system resource of the target database service may be understood as system resources of the database system required when this target database service is executed normally. The desired service parameter of the target database service may be understood as parameters configured for the target database service or parameters configured for the target database when this target database service is executed normally. When at least one of the state of the target system resource and the state of the target service parameter is the unstable state, it may be understood that at least one of the state of the target system resource and the state of the target service parameter changes from a stable state to the unstable state, that is, at least one of the state of the target system resource and the state of the target service parameter is changed. In an implementation of the present disclosure, the checking whether at least one of the state of the target system resource and the state of the target service parameter is the unstable state may be done with a corresponding tool. For example, when it is determined that a change occurs in at least one of system resources of the database system and service parameters of at least one database service, a resource reconcile action in the Kubernets software may be triggered to execute a state machine entry (DoStateMainEnter) of a state machine through a resource reconcile entry, so as to check whether at least one of the state of the system resources and the state of the service parameters is the unstable state, that is, whether at least one of the state of the target system resource and state of the target service parameter changes from the stable state to the unstable state. According to the technical solution provided in the embodiments of the present disclosure, it can be relatively conveniently determined whether at least one of the state of the target system resource and the state of the target service parameter is changed, thereby improving the efficiency of checking whether at least one of the target system resource and the target service parameter is changed.

In an implementation of the present disclosure, the database service processing method further comprises: in response to the execution, according to the changed database service configuration file, of the database service configuration process for the target database service having been completed, setting a state of the changed target system resource and a state of the changed target service parameter to a stable state, wherein the state of the changed target system resource being the stable state is used for indicating that the changed target system resource is consistent with the desired system resource of the target database service, and the state of the changed target service parameter being the stable state is used for indicating that the changed target service parameter is consistent with the desired service parameter of the target database service. According to the technical solution provided in the embodiments of the present disclosure, it is possible to facilitate monitoring of whether a change further occurs in the changed target system resource and the changed target service parameter after the database service configuration process.

In an implementation of the present disclosure, the database service processing method further comprises: in response to the execution, according to the changed database service configuration file, of the database service configuration process for the target database service having been completed, checking whether at least one of the state of the changed target system resource and the state of the changed target service parameter is the unstable state; and in response to determining that at least one of the state of the changed target system resource and the state of the changed target service parameter is the unstable state, acquiring a further changed database service configuration file, the further changed database service configuration file is arranged based on at least one further changed executable unit obtained by packaging, according to the minimum granularity of the target database service, a further changed database service model operation corresponding to the target database service, and the further changed database service model operation is used for performing an operation on at least one of the further changed target system resource and the further changed target service parameter; and executing, according to the further changed database service configuration file, the database service configuration process for the target database service. According to the technical solution provided in the embodiments of the present disclosure, it is possible to ensure that the target database service can be executed normally even after a change further occurs in the changed target system resource or the changed target service parameter, thereby reducing the probability that the target database service cannot be executed normally due to a further change in the changed target system resource or the changed target service parameter.

Figure 4:
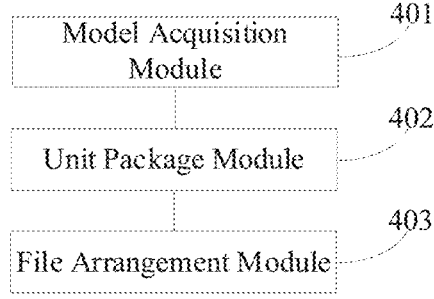
FIG. 4 shows a structural block diagram of a database service processing apparatus according to an implementation of the present disclosure.

In an implementation of the present disclosure, FIG. 3 shows a schematic operation sequence diagram of one example of the database service processing method according to an implementation of the present disclosure. As shown in FIG. 3, at step 301, after an application side modifies Resource 31 through CRD in the Kubernets software (Resource 31 includes at least one of system resources of a database system and service parameters of a data service), a management controller in the Kubernets software that monitors a database resource model determines, according to a monitoring result, that a change occurs in at least one of the system resources of the database system and the service parameters of the database service, thereby triggering a resource reconcile action of Reconcile 32 in the Kubernets software. At step 302, after the resource reconcile action is triggered, DoStateMainEnter (workflow entry) of State Machine 33 is executed through a reconcile entry. At step 303, State Machine 33 traverses its own StateTranslateMap. At step 304, State Machine 33 sequentially executes event-Checker (state event check) to detect whether a state change in a state of the target system resource or a state of the target service parameter is triggered, that is, to determine whether at least one of the state of the target system resource and the state of the target service parameter is an unstable state. At step 305, when it is determined whether at least one of the state of the target system resource and the state of the target service parameter is the unstable state, it is determined that StateTranslate 34 appears, and UnstateMainEnter (unstable state main entry) 35 corresponding to the unstable state is executed. At step 306, a changed database service configuration file is acquired, and a workflow is executed according to the changed database service configuration file, that is, a database service configuration process is executed for the target database service according to the changed database service configuration file. At step 307, a state of changed Resource 31 (i.e., a state of the changed target system resource and a state of the changed target service parameter) is set to a stable state. At step 308, a reconcile entry of Reconcile 32 is triggered to execute a workflow entry of State Machine 33. At step 309, State Machine 33 traverses its own state translate map. At step 310, State Machine 33 sequentially executes eventChecker (state event check) to detect whether a state change in the state of the changed target system resource or the state of the changed target service parameter is triggered, that is, to determine whether at least one of the state of the changed target system resource and the state of the changed target service parameter is the unstable state. At step 311, when it is determined that the state of the changed target system resource and the state of the changed target service parameter are both the stable state, stateMainEnter (stable state main entry) 36 corresponding to the stable state is executed. At step 312, when it is determined that the state of the changed target system resource or the state of the changed target service parameter is the unstable state, it is determined that StateTranslate 34 appears, and UnstateMainEnter (unstable state main entry) 35 corresponding to the unstable state is executed. At step 313, a further changed database service configuration file is acquired, and the workflow is executed according to the further changed database service configuration file, that is, the database service configuration process is executed for the target database service according to the further changed database service configuration file With reference to FIG. 4, described below is a database service processing apparatus according to an implementation of the present disclosure. FIG. 4 shows a structural block diagram of a database service processing apparatus according to an implementation of the present disclosure. As shown in FIG. 4, the database service processing apparatus 400 comprises: a model acquisition module 401, configured for acquiring a target database service model corresponding to a target database service, wherein the target database service model is used for indicating at least one target database service model operation corresponding to the target database service, the target database service model operation is used for performing an operation on at least one of a target system resource corresponding to the target database service and a target service parameter of the target database service in a database system; a unit package module 402, configured for acquiring at least one executable unit according to the target database service model, wherein the at least one executable unit is packaged, according to a minimum granularity of the target database service, with the target database service model operation; and a file arrangement module 403, configured for acquiring a target database service configuration file according to service requirements of the target database service, wherein the target database service configuration file is arranged based on the at least one executable unit and meets workflow arrangement requirements.

Compared with the foregoing solutions, in the solution proposed by the present disclosure, by acquiring a target database service model corresponding to a target database service, based on this target database service model, a correspondence may be determined between a target database service model operation for performing an operation on at least one of a target system resource and a target service parameter, and the target database service; by acquiring at least one executable unit according to the target database service model, the at least one executable unit is packaged, according to a minimum granularity of the target database service, with the target database service model operation, it is possible to enable the executable unit to be used for arranging each step required for the target database service according to workflow arrangement requirements under a condition that the executable unit is allowed to perform the operation on at least one of the target system resource and the target service parameter; and by acquiring a target database service configuration file according to service requirements of the target database service, which is arranged based on the at least one executable unit and meets workflow arrangement requirements, it is possible to acquire a target database service configuration file that can be used for execute a database service configuration process for the target database service, so as to achieve the purpose of performing automatic allocation for at least one of the target system resource and the target service parameter required for the target database service, thereby reducing the probability of errors in a process of allocating system resources or service parameters for a database service, and improving the utilization efficiency of system resources or service parameters.

Those skilled in the art may understand that the technical solutions described with reference to FIG. 3 may be combined with any of the embodiments described above, thereby having the technical effects achieved by any of the embodiments described above. For specific content, reference may be made to the description of the above embodiments, and the specific content thereof will not be repeated here.

Figure 5:
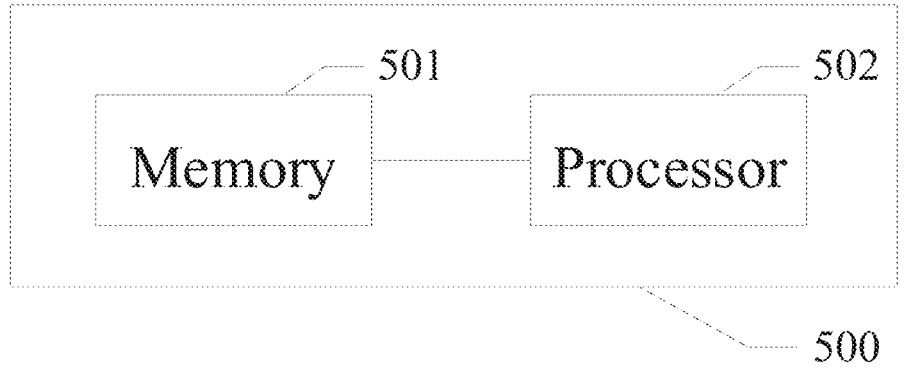
FIG. 5 shows a structural block diagram of an electronic device according to an implementation of the present disclosure.

FIG. 5 shows a structural block diagram of an electronic device according to an implementation of the present disclosure. An implementation of the present disclosure further provides an electronic device, as shown in FIG. 5, comprising at least one processor 501; and a memory 502 communicatively connected to the at least one processor 501; wherein memory 502 stores instructions that can be executed by the at least one processor 501, and the instructions are executed by the at least one processor 501 to execute the steps in the foregoing database service processing method.

The flow charts and block diagrams in the drawings illustrate architectures, functions, and operations of systems, methods, and computer program products possibly achieved in accordance with various implementations of the present disclosure. At this point, each block in a flow chart or block diagram may represent a module, a program segment, or a part of code that contains one or more executable instructions for implementing a specified logical function. It should also be noted that in some alternative implementations, functions annotated in blocks may also occur in a different order than those annotated in the drawings. For example, two consecutively listed blocks may actually be executed basically in parallel, and sometimes they may also be executed in an opposite order, depending on the functionality involved. It should also be noted that each block in a block diagram and/or flow chart, as well as a combination of blocks in the block diagram and/or flow chart, may be implemented using dedicated hardware-based systems that execute specified functions or operations, or may be implemented using a combination of dedicated hardware and computer instructions.

The units or modules described and involved in the implementations of the present disclosure may be implemented through software or hardware. The described units or modules may also be provided in a processor, and names of these units or modules do not constitute a limitation on the units or modules themselves under certain circumstances.

As another aspect, the present disclosure further provides a computer-readable storage medium. This computer-readable storage medium may be a computer-readable storage medium included in a node described in the above implementations; it may also be an independent computer-readable storage medium without being built into a device. The computer-readable storage medium stores one or more programs, which are used by one or more processors to execute the methods described in the present disclosure.

The above description is only an explanation of the preferred embodiments of the present disclosure and the technical principles as applied. Those skilled in the art should understand that the technical solutions involved in the present disclosure are not limited to technical solutions formed by a particular combination of the above technical features, but should also cover other technical solutions formed by any combination of the above technical features or their equivalent features without departing from the inventive concept of the present disclosure, for example, a technical solution formed by replacing the above features with (but not limited to) technical features having similar functions disclosed in the present disclosure.

As described above, in an implementation of the present disclosure, the database resource model may be achieved through a corresponding tool, as further described below. For example, it may be defined through the Custom Resource Definition (CRD) application interface in the Kubernets software. The specific definition of the database resource model may be shown as below:

```
kind: CustomResourceDefinition
metadata: name: mpdclusters.mpd.polardb.aliyun.com
spec:
    group: mpd.polardb.aliyun.com
    names:
        kind: MPDCluster
        listKind: MPDClusterList
        plural: mpdclusters
        singular: mpdcluster
    scope: Namespaced
    validation:
        openAPIV3 Schema:
            description: MPDCluster is the Schema for the
                mpdclusters API
            properties:
                metadata: type: object
                spec:
                    properties:
                        classInfo:
                            properties:
                                className: type: string
                                cpu: type: string
                                iops: type: string
                                memory: type: string
                                required:-className
                            type: object
                        classInfoModify To:
                            properties:
                                className: type: string
                                cpu: type: string
                                iops: type: string
                                memory: type: string
                                required:—className
                            type: object
                        dbClusterType: type: string
                        dbProxyInfo:
                            properties:
                                consistencyLevel: type: integer
                                enabled: type: boolean
                                name: type: string
                                resourceType: type: string
                                required:—consistency Level—en-
abled—name—resource Type
                            type: object
                        dbType: type: string
                        description: type: string
                        followerNum: type: integer
                        localVolName: type: string
                        netCfg:
                            properties:
                                enableEngineAdminIP: type: boolean
                                enableProxy AdminIP: type: boolean
                                engineAddress: type: string
                                engineStartPort: type: integer
                                leaderFloatingIP:
                                    properties:
                                        basedNetIf: type: string
                                        gateWay: type: string
                                        ip Address: type: string
                                        ip AddressCfgType: type: string
                                        ipMode: type: string
                                        mask: type: integer
                                    type: object
```

```
                                netType:
                                    type: string
                                portStep: type: integer
                                proxy NetIF: type: string
                                proxy StartPort: type: integer
                            type: object
                        operatorName: type: string
                        resource Additional:
                            additionalProperties:
                                description:
                                properties:
                                    config: type: string
                                    cpu cores:
                                        anyOf:—type:        integer—type:
string
                                        pattern:
^(\+|−)?(([0-9[*]?)|(\[0-9]+))((KMGTPE]i)|
[numkMGTPE]|   (E8   eE](\+|−)?(([0-9]+(\[0-9]*)?)|(\[0-
9]+))))?$
                                        x-kubernetes-int-or-string: true
                                    limit memory:
                                        anyOf:-type: integer-type: string
                                        pattern:
^(\+|−)?(([0-9[*]?)|(\[0-9]+))((KMGTPE]i)|
[numkMGTPE]|   (E8   eE](\+|−)?(([0-9]+(\[0-9]*)?)|(\[0-
9]+))))?$
                                        x-kubernetes-int-or-string: true
                                    required:-config-cpu       cores-limit
memory
                                type: object
                            type: object
                        shareStore:
                            properties:
                                diskQuota: type: string
                                drive: type: string
                                is VolumeFormat: type: boolean
                                sharePvcName: type: string
                                sharePvcNamespace: type: string
                                share VolumeWWID: type: string
                                volumeFormat: type: string
                                volumeId: type: string
                                volumeType: type: string
                                required:—drive
                            type: object
                        versionCfg:
                            properties:
                                clusterManagerImage: type: string
                                engineImage: type: string
                                managerImage: type: string
                                otherImages:
                                    additionalProperties: type: string
                                    type: object
                                pfsdImage: type: string
                                pfsdToolImage: type: string
                                versionName: type: string
                            type: object
                        versionCfgModifyTo:
                            properties:
                                clusterManagerImage: type: string
                                engineImage: type: string
                                managerImage: type: string
                                otherImages:
                                    additionalProperties: type: string
                                    type: object
                                pfsdImage: type: string
                                pfsdToolImage: type: string
                                version Name: type: string
                            type: object
``` required:
  classInfo-classInfoModifyTo-dbClus-
terType-followerNum
   operatorName—versionCfg
   type: object
state:
  properties:
   clusterManagerState:
    properties:
     deploy Name: type: string
     workingPort: type: integer
    type: object
    clusterState: type: string
    conditions:
     items:
      properties:
       lastProbeTime:
        format: date-time
        type: string
       lastTransition Time:
        to another.
        format: date-time
        type: string
       message: type: string
       reason: type: string
       state: type: string
       type: type: string
      required:-state-type
      type: object
     type: array
   dbInstanceState:
    additionalProperties:
    properties:
     currentState:
      properties:
       errorInfo: type: string
       finish At:
        format: date-time
        type: string
       reason: type: string
       startAt:
        format: date-time
        type: string
       state: type: string
      type: object
     hostClientIP: type: string
     insClassInfo:
      properties:
       className: type: string
       cpu: type: string
       iops: type: string
       memory: type: string
      required:—className
      type: object
     insId: type: string
     insName: type: string
     insType: type: string
     installed: type: boolean
     lastState:
      properties:
       errorInfo: type: string
       finishAt:
        format: date-time
        type: string
       reason: type: string startAt:
        format: date-time
        type: string
       state: type: string
      type: object
     netInfo:
      properties:
       enableWorkingAdminIP:  type:
boolean
       netType: type: string
       workingAdminIP: type: string
       workingHostIP: type: string
       workingPort: type: integer
      type: object
     nodeName: type: string
     physicalInsId: type: string
     podName: type: string
     podNameSpace: type: string
     polarFsHostId: type: string
     role: type: string
     state: type: string
     versionInfo:
      properties:
       clusterManagerImage:  type:
string
       engineImage: type: string
       managerImage: type: string
       otherImages:
        additionalProperties:  type:
string
        type: object
       pfsdImage: type: string
       pfsd ToolImage: type: string
       version Name: type: string
      type: object
     type: object
    type: object
   floatingIP:
    properties:
     basedNetIf: type: string
     gateWay: type: string
     ipAddress: type: string
     ip AddressCfgType: type: string
     ipMode: type: string
     mask: type: integer
    type: object
   followerNum: type: integer
   insClassInfo:
    properties:
     className: type: string
     cpu: type: string
     iops: type: string
     memory: type: string
    required:—className
    type: object
   leaderInstanceHost: type: string
   leaderInstanceId: type: string
   localVolName: type: string
   logicId: type: string
   proxy State:
    properties:
     maxScaleName: type: string
     maxScaleNameSpace: type: string

```
        workingAddr:
          items:
            properties:
              enableWorkingAdminIP:
  type: boolean
              netType: type: string
              workingAdminIP:     type:
  string
              workingHostIP:      type:
  string
              workingPort: type: integer
            type: object
          type: array
            workingPort: type: integer
          type: object
        type: object
      type: object
state:
  acceptedNames:
    kind: " "
    plural: " "
  conditions: [ ]
stored Versions: [ ]
```

What is claimed is:

1. A database service processing method, comprising:

acquiring a target database service model corresponding to a target database service, wherein the target database service model is used for indicating at least one target database service model operation corresponding to the target database service, the target database service model operation is used for performing an operation on at least one of a target system resource corresponding to the target database service and a target service parameter of the target database service in a database system;

acquiring at least one executable unit according to the target database service model, wherein the at least one executable unit is packaged, according to a minimum granularity of the target database service, with the target database service model operation; and acquiring a target database service configuration file according to service requirements of the target database service, wherein the target database service configuration file is arranged based on the at least one executable unit and meets workflow arrangement requirements;

wherein the method further comprises:

acquiring a changed database service configuration file in response to determining that at least one of the target system resource and the target service parameter has been changed, wherein the changed database service configuration file is arranged based on at least one changed executable unit, the at least one changed executable unit is obtained by packaging, according to the minimum granularity of the target database service, a changed database service model operation corresponding to the target database service, the changed database service model operation is used for performing an operation on at least one of a changed target system resource and a changed target service parameter; and executing, according to the changed database service configuration file, the database service configuration process for the target database service.

2. The database service processing method according to claim 1, wherein the method further comprises:

executing, according to the database service configuration file, a database service configuration process for the target database service.

3. The database service processing method according to claim 2, wherein the method further comprises:

interrupting the execution of the database service configuration process in response to the execution of the database service configuration process having been failed; and acquiring interruption recovery indication information, and recovering the execution of the database service configuration process according to the interruption recovery indication information, wherein the interruption recovery indication information is used for indicating a data flow step for recovering the execution of the database service configuration process.

4. The database service processing method according to claim 3, wherein the method further comprises:

setting a state of the target system resource and a state of the target service parameter to a stable state in response to the execution of the database service configuration process having been interrupted or completed, wherein the state of the target system resource being the stable state is used for indicating that the target system resource is consistent with a desired system resource of the target database service, and the state of the target service parameter being the stable state is used for indicating that the target service parameter is consistent with a desired service parameter of the target database service; or setting a state of the target system resource and a state of the target service parameter to an unstable state in response to the execution of the database service configuration process not having being interrupted or having been recovered, wherein the state of the target system resource being the unstable state is used for indicating that the target system resource is inconsistent with a desired system resource of the target database service, and the state of the target service parameter being the unstable state is used for indicating that the target service parameter is inconsistent with a desired service parameter of the target database service.

5. The database service processing method according to claim 1, wherein, prior to acquiring the changed database service configuration file in response to determining that at least one of the target system resource and the target service parameter has been changed, the method further comprises:

monitoring a database resource model, wherein the database resource model is used for indicating system resources of the database system and service parameters of at least one database service; and in response to determining, according to a monitoring result, that at least one of the system resources of the database system and the service parameters of the at least one database service has been changed, checking whether at least one of the target system resource and the target service parameter is changed.

6. The database service processing method according to claim 5, wherein the checking whether at least one of the target system resource and the target service parameter is changed comprises:

checking whether at least one of a state of the target system resource and a state of the target service parameter is an unstable state, wherein the state of the target system resource being the unstable state is used for indicating that the target system resource is inconsistent with a desired system resource of the target database service, and the state of the target service parameter being the unstable state is used for indicating that the target service parameter is inconsistent with a desired service parameter of the target database service.

7. The database service processing method according to claim 6, wherein the method further comprises:

in response to the execution, according to the changed database service configuration file, of the database service configuration process for the target database service having been completed, setting a state of the changed target system resource and a state of the changed target service parameter to a stable state, wherein the state of the changed target system resource being the stable state is used for indicating that the changed target system resource is consistent with the desired system resource of the target database service, and the state of the changed target service parameter being the stable state is used for indicating that the changed target service parameter is consistent with the desired service parameter of the target database service.

8. The database service processing method according to claim 7, wherein the method further comprises:

checking whether at least one of the state of the changed target system resource and the state of the changed target service parameter is the unstable state; and in response to determining that at least one of the state of the changed target system resource and the state of the changed target service parameter is the unstable state, acquiring a further changed database service configuration file, wherein the further changed database service configuration file is arranged based on at least one further changed executable unit, the at least one further changed executable unit is obtained by packaging, according to the minimum granularity of the target database service, a further changed database service model operation corresponding to the target database service, and the further changed database service model operation is used for performing an operation on at least one of the further changed target system resource and the further changed target service parameter; and executing, according to the further changed database service configuration file, the database service configuration process for the target database service.

9. An electronic device, comprising at least one processor; and a memory communicatively connected to the at least one processor and stores instructions executable by the at least one processor; wherein the instructions are executed by the at least one processor to perform operations of:

acquiring a target database service model corresponding to a target database service, wherein the target database service model is used for indicating at least one target database service model operation corresponding to the target database service, the target database service model operation is used for performing an operation on at least one of a target system resource corresponding to the target database service and a target service parameter of the target database service in a database system;

acquiring at least one executable unit according to the target database service model, wherein the at least one executable unit is packaged, according to a minimum granularity of the target database service, with the target database service model operation; and acquiring a target database service configuration file according to service requirements of the target database service, wherein the target database service configuration file is arranged based on the at least one executable unit and meets workflow arrangement requirements;

wherein the instructions are executed by the at least one processor to perform further operations of:

acquiring a changed database service configuration file in response to determining that at least one of the target system resource and the target service parameter has been changed, wherein the changed database service configuration file is arranged based on at least one changed executable unit, the at least one changed executable unit is obtained by packaging, according to the minimum granularity of the target database service, a changed database service model operation corresponding to the target database service, the changed database service model operation is used for performing an operation on at least one of a changed target system resource and a changed target service parameter; and executing, according to the changed database service configuration file, the database service configuration process for the target database service.

10. The electronic device according to claim 9, wherein the instructions are executed by the at least one processor to perform further operations of:

executing, according to the database service configuration file, a database service configuration process for the target database service.

11. The electronic device according to claim 10, wherein the instructions are executed by the at least one processor to perform further operations of:

interrupting the execution of the database service configuration process in response to the execution of the database service configuration process having been failed; and acquiring interruption recovery indication information, and recovering the execution of the database service configuration process according to the interruption recovery indication information, wherein the interruption recovery indication information is used for indicating a data flow step for recovering the execution of the database service configuration process.

12. The electronic device according to claim 11, wherein the instructions are executed by the at least one processor to perform further operations of:

setting a state of the target system resource and a state of the target service parameter to a stable state in response to the execution of the database service configuration process having been interrupted or completed, wherein the state of the target system resource being the stable state is used for indicating that the target system resource is consistent with a desired system resource of the target database service, and the state of the target service parameter being the stable state is used for indicating that the target service parameter is consistent with a desired service parameter of the target database service; or setting a state of the target system resource and a state of the target service parameter to an unstable state in response to the execution of the database service configuration process not having being interrupted or having been recovered, wherein the state of the target system resource being the unstable state is used for indicating that the target system resource is inconsistent with a desired system resource of the target database service, and the state of the target service parameter being the unstable state is used for indicating that the target service parameter is inconsistent with a desired service parameter of the target database service.

13. The electronic device according to claim 9, wherein the instructions are executed by the at least one processor to perform further operations of:

monitoring a database resource model, wherein the database resource model is used for indicating system resources of the database system and service parameters of at least one database service; and in response to determining, according to a monitoring result, that at least one of the system resources of the database system and the service parameters of the at least one database service has been changed, checking whether at least one of the target system resource and the target service parameter is changed.

14. The electronic device according to claim 13, wherein the instructions are executed by the at least one processor to perform further operations of:

checking whether at least one of a state of the target system resource and a state of the target service parameter is an unstable state, wherein the state of the target system resource being the unstable state is used for indicating that the target system resource is inconsistent with a desired system resource of the target database service, and the state of the target service parameter being the unstable state is used for indicating that the target service parameter is inconsistent with a desired service parameter of the target database service.

15. The electronic device according to claim 14, wherein the instructions are executed by the at least one processor to perform further operations of:

in response to the execution, according to the changed database service configuration file, of the database service configuration process for the target database service having been completed, setting a state of the changed target system resource and a state of the changed target service parameter to a stable state, wherein the state of the changed target system resource being the stable state is used for indicating that the changed target system resource is consistent with the desired system resource of the target database service, and the state of the changed target service parameter being the stable state is used for indicating that the changed target service parameter is consistent with the desired service parameter of the target database service.

16. The electronic device according to claim 15, wherein the instructions are executed by the at least one processor to perform further operations of:

checking whether at least one of the state of the changed target system resource and the state of the changed target service parameter is the unstable state; and in response to determining that at least one of the state of the changed target system resource and the state of the changed target service parameter is the unstable state, acquiring a further changed database service configuration file, wherein the further changed database service configuration file is arranged based on at least one further changed executable unit, the at least one further changed executable unit is obtained by packaging, according to the minimum granularity of the target database service, a further changed database service model operation corresponding to the target database service, and the further changed database service model operation is used for performing an operation on at least one of the further changed target system resource and the further changed target service parameter; and executing, according to the further changed database service configuration file, the database service configuration process for the target database service.

17. A non-transitory computer-readable storage medium, storing one or more programs, wherein the one or more programs are executed by one or more processors to perform operations of:

acquiring a target database service model corresponding to a target database service, wherein the target database service model is used for indicating at least one target database service model operation corresponding to the target database service, the target database service model operation is used for performing an operation on at least one of a target system resource corresponding to the target database service and a target service parameter of the target database service in a database system;

acquiring at least one executable unit according to the target database service model, wherein the at least one executable unit is packaged, according to a minimum granularity of the target database service, with the target database service model operation; and acquiring a target database service configuration file according to service requirements of the target database service, wherein the target database service configuration file is arranged based on the at least one executable unit and meets workflow arrangement requirements;

wherein the one or more programs are executed by one or more processors to perform further operations of:

acquiring a changed database service configuration file in response to determining that at least one of the target system resource and the target service parameter has been changed, wherein the changed database service configuration file is arranged based on at least one changed executable unit, the at least one changed executable unit is obtained by packaging, according to the minimum granularity of the target database service, a changed database service model operation corresponding to the target database service, the changed database service model operation is used for performing an operation on at least one of a changed target system resource and a changed target service parameter; and executing, according to the changed database service configuration file, the database service configuration process for the target database service.

18. The non-transitory computer-readable storage medium according to claim 17, wherein the one or more programs are executed by one or more processors to perform further operations of:

executing, according to the database service configuration file, a database service configuration process for the target database service.

* * * * *